UNITED STATES PATENT OFFICE.

AARON C. HORN, OF NEW YORK, N. Y.

COMPOSITION FOR WATERPROOFING CONCRETE.

1,048,695.  Specification of Letters Patent.  Patented Dec. 31, 1912.

No Drawing.  Application filed February 28, 1912. Serial No. 680,525.

*To all whom it may concern:*

Be it known that I, AARON C. HORN, a citizen of the United States, and a resident of New York, in the county of New York and State of New York, have invented certain new and useful Improvements in Compositions for Waterproofing Concretes, of which the following is a specification.

This invention relates to a composition intended for waterproofing cement and concrete and relates in particular to a fluent or pasty composition, carrying a water-insoluble metallic soap, intimately incorporated with other waterproofing materials.

In waterproofing concrete and cement by what is known as the integral system, it is customary to incorporate small amounts of water soluble or water insoluble soaps. The water soluble soaps eventually combine with the lime of the cement to form a water insoluble lime soap. The water insoluble soaps either pre-formed or formed in the concrete mass are often not permanent in their waterproofing properties, for, in the course of time, under severe service conditions, some decomposition occurs which causes a reduction in the resistance of the mass to the ingress of moisture. This may be due partly to oxidation and partly to hydrolysis.

The present invention has for its object the production of a waterproofing composition, which is permanent in character and which, if desired, may be made in the form of a paste or fluent material, suitable for incorporating with the water used for gaging the cement.

While water insoluble soaps are prone to hydrolysis or other degenerative changes under severe service conditions, such compounds are not so susceptible to hydrolytic action when fortified by the presence of a drying oil, or other similar material.

The present invention comprises the use of a water insoluble soap, such as calcium stearate, or stearates, oleates, palmitates, linoleates, ricinolates, ceretates and the like of such bases as barium, magnesium, calcium, zinc, manganese, iron, alumina, copper, etc. As a fortifying agent, I preferably make use of a drying oil, in particular Chinese wood oil, or tung oil, but I may also employ other drying oils, such as linseed, or perilla oil, or the semi-drying oils, such as corn oil, cotton seed oil and peanut oil, Boiled fish oil is also a useful fortifying agent. In addition to these oils which possess siccative properties to a greater or less degree, I also may use, to any desired extent, non-drying oils, such as petroleum oils of various sorts, or coal tar oil, such as anthracene, or I even may make use of additions of tars, pitches, asphaltic bodies and the like.

In order to secure an intimate incorporation of the water insoluble metallic soap with the oily fortifying agent, I provide an emulsion forming compound, which may be either a water soluble soap, such as potassium stearate or sodium oleate, or other similar soapy bodies, including the water soluble soaps of cotton seed, corn, fish, linseed and other saponifiable oils. Soaps may also be prepared from ordinary resin or similar resinous bodies by suitably saponifying. The emulsion forming agent may also be prepared from proteid material, such as glue or casein. The latter body is well adapted to form emulsions in aqueous alkaline solutions. Another emulsifying agent, which is of a non-organic character is silicate of soda or the corresponding potassium compound.

When proteid bodies such as casein are used, it is important to have present a preservative agent. Inasmuch as the waterproofing material is distributed through a very great mass of concrete and is thus highly attenuated, ordinary preservatives do not afford satisfactory results and it therefore becomes desirable to incorporate a preservative material which is capable of uniting with the casein compound so that a particle of preservative becomes attached to each particle of casein as it were, thereby exerting a preservative action, irrespective of the degree of attenuation of the waterproofing compound. Casein may be brought into aqueous solution by means of an alkali such as ammonia, carbonate of soda, borax and the like. It is desirable to use for this purpose a larger quantity of alkali than is desired in the final composition, Therefore I prefer to use an excess of alkali to dissolve the casein and to subsequently neutralize a portion, at least, of the alkali by the addition of a quantity of acid after the casein has been dissolved. Also it is desirable to incorporate a small amount of fixative material such as a salt of chromium capable of uniting with the casein to reduce the solubility, although the lime present in Portland cement reacts with casein to form caseinate of lime, which is a fairly insoluble compound. In order to secure a preservative agent which remains attached to the casein after the latter body has been incorporated with the cement, I preferably form a metallic caseinate, using as a metallic base a body of strongly antiseptic properties, such for example as the compounds of mercury, copper, zinc, arsenic and the like. If these metals in the form of metal soluble salts are introduced in the alkaline solution of casein, the corresponding metallic caseinate is formed.

An illustrative formula will make clear the foregoing statements: 8 parts of casein are boiled with 48 parts of water and 1½ parts of soda ash are added. The mixture is boiled until the casein is thoroughly dissolved, when 16 parts of Chinese wood oil are added. By rapidly boiling this mixture an emulsion of the oil is secured. Then 4 parts of a solution containing 10% of chromium sulfate or chlorid, 10% of copper sulfate and about a like amount of sulfuric or hydrochloric acid is carefully added to the emulsion, thereby causing the precipitation of some of the casein upon the particles of the emulsified wood oil which further increases the stability of the composition. Finally, the composition is made into a paste formed by the addition of finely divided stearate of lime, preferably containing an excess of free lime. Such a composition readily mixes with water to yield a suspension of the waterproofing ingredients and when this aqueous mixture is used for gaging the concrete or cement the thorough distribution of the waterproofing agent is secured.

While the above formula specifically sets forth a composition carrying casein as the emulsifying agent, I may, as stated above, make use of soaps, or other suitable emulsifying materials. In addition to those above mentioned, I also may use such thickening materials as ordinary starch or the water soluble acetic acid derivatives of starch, known as acetyl starch, or gum, such as arabic or tragacanth. As hereinbefore stated, pitches or asphalt may be incorporated and this is best done by heating such materials and thinning with a suitable oil, which mixture is subsequently emulsified in the manner indicated. Instead of asphalt, a resinous body, such as copal may be introduced in a similar manner. In some cases it is desirable to introduce weighting or extending material, which sometimes assists in the incorporation of the waterproofing materials with the cement and for such purpose finely ground talc, asbestine, china clay, fullers' earth and the like may be introduced.

In the foregoing description I have stated certain preferred ingredients in illustration of the preferred embodiment of my invention, but I do not wish to limit myself to the precise statement thereof, but may invoke the doctrine of equivalency in so far as same may be herein applicable.

To recapitulate, my invention has to do with a waterproofing composition for concrete and cement, which composition is preferably in a paste or fluent form readily adapted to be reduced with water and which composition comprises an emulsion of an oily body, preferably a drying oil or an oily body admixed with resinous or asphaltic material and the like, incorporated with a water-insoluble metallic soap preferably calcium stearate; said composition carrying a thickening or emulsifying agent, such as casein, silicate of soda, water soluble soaps and the like and in the case of a casein emulsifier preferably carrying a preservative agent combined with said casein.

Illustrative of the use of other thickeners, or emulsifying agents other than casein, I may give the following formulas:— Asphalt, 3 parts, petroleum oil, 6 parts, Chinese wood oil, 6 parts, water soluble soaps, 4 parts; calcium stearate 7 parts and water to form a pasty composition. Still another formula consists of asphalt 2 parts, pitch 3 parts, potassium oleate 4 parts, petroleum oil 7 parts, calcium stearate 6 parts, barium stearate 1 part and water to make a fluent or pasty composition.

Under certain circumstances, I may add to the compositions set forth above, a moderate amount of a set-corrective such as barium chlorid, for example. This cannot be used to advantage when incompatible with the other components of the composition. With soap of a water-soluble nature barium chlorid precipitates the fatty acids in the form of insoluble barium soap. Waterproofing compounds generally retard the set of cement and tend, if anything, slightly to lower the strength thereof, an impairment of properties which is largely eliminated by the set-corrective.

The foregoing compositions, but especially those containing casein are useful for waterproofing plaster, which is not readily and effectually waterproofed by calcium stearate and the like, and the present invention comprehends the use of such casein compositions and the like for waterproofing plaster, and also the product of such incorporation, namely plaster carrying a caseinate in conjunction with a water-insoluble soap or similar material. Not only can I waterproof lime plaster in this way, but also gypsum or hard wall plaster can be rendered properly resistant to the penetration of moisture. Ordinarily this is difficult as calcium sulfate is relatively soluble in water.

What I claim is—

1. A waterproofing composition comprising Chinese wood oil calcium stearate, casein, and a preservative agent therefor and water.

2. A waterproofing composition comprising a drying oil calcium stearate, casein, a preservative compound therefor and water.

3. A waterproofing composition, comprising an oily body, a water insoluble soap in a finely divided condition, casein, a preservative therefor and water.

4. A waterproofing composition, comprising an emulsion of an oily body, calcium stearate and water.

5. A waterproofing composition comprising an oily body, a water insoluble metallic soap in a finely divided condition water and an emulsifying agent, said composition having a pasty consistency.

Signed at New York city in the county of New York and State of New York this 24th day of February A. D. 1912.

AARON C. HORN.

Witnesses:
EDWARD D. NEWMAN,
GERTRUDE R. SCHEERENBECK.